United States Patent [19]

Brimm

[11] 4,188,811
[45] Feb. 19, 1980

[54] METAL FORMING METHODS

[75] Inventor: Daniel J. Brimm, La Jolla, Calif.

[73] Assignee: Chem-tronics, Inc., El Cajon, Calif.

[21] Appl. No.: 928,315

[22] Filed: Jul. 26, 1978

[51] Int. Cl.² .............................................. B21D 22/12
[52] U.S. Cl. ..................................................... 72/63
[58] Field of Search ..................... 72/63, 54; 100/211

[56] References Cited

U.S. PATENT DOCUMENTS

| 3,739,617 | 6/1973 | Stejskal | 72/63 |
| 3,875,778 | 4/1975 | Hellgren | 72/63 |

*Primary Examiner*—Leon Gilden
*Attorney, Agent, or Firm*—Le Blanc, Nolan, Shur & Nies

[57] ABSTRACT

Methods for shaping metallic workpieces which utilize a single faced die and the use of heat and pressure to conform the article to the shape of the die surface by creep forming.

17 Claims, 4 Drawing Figures

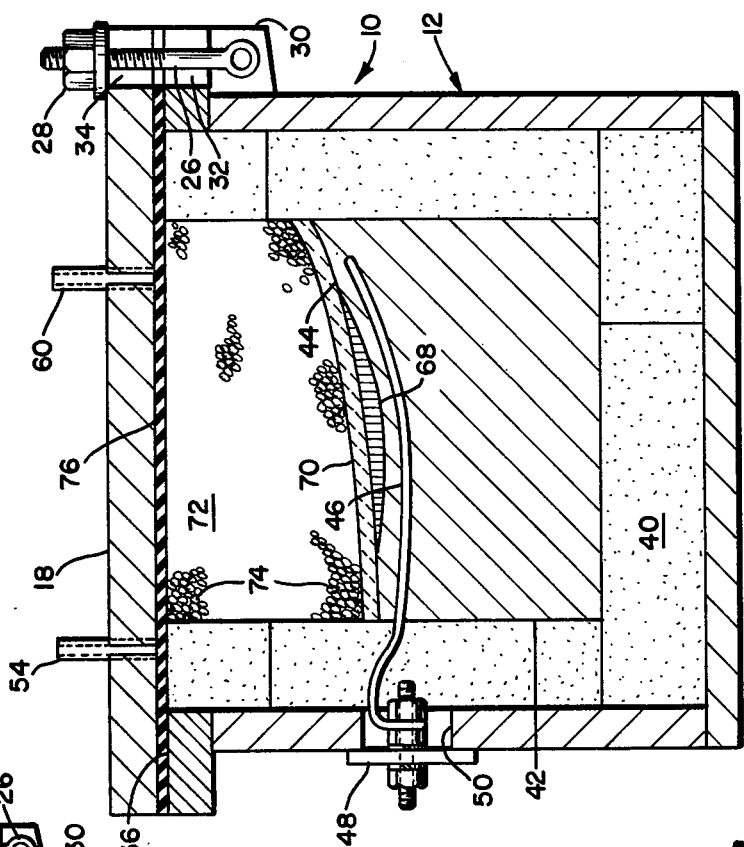
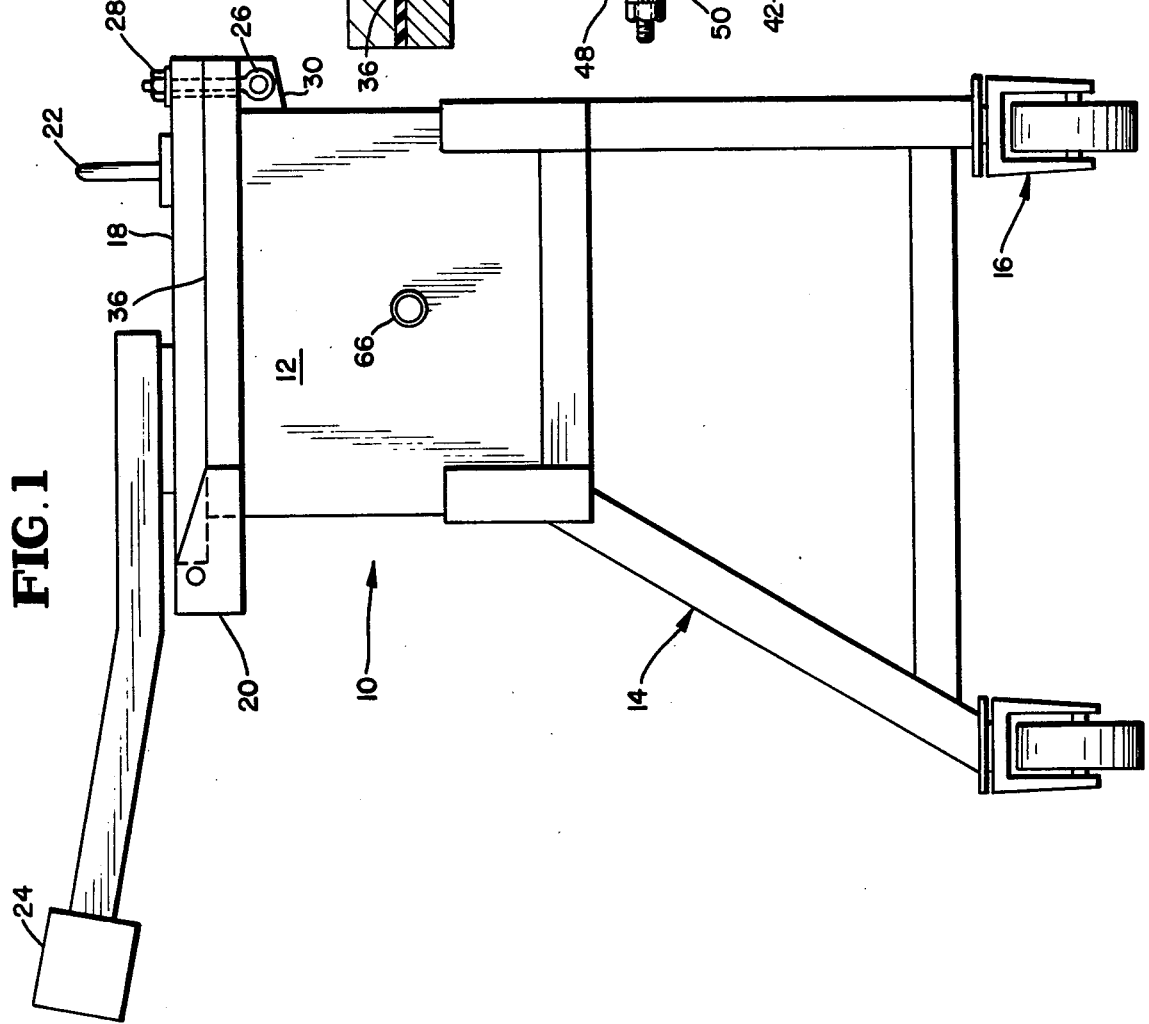

METAL FORMING METHODS

The present invention relates to novel, improved methods for shaping high temperature and other metals and alloys.

One presently important application of my invention is in the shaping of turbine and compressor blades to either their original, or new, configurations; and the principles of the invention will, accordingly, be developed primarily by reference to that application. It is to be understood, however, that this is being done principally for the sake of convenience and clarity and is not intended to limit the scope of the invention as defined in the appended claims as it will become obvious hereinafter to those skilled in the relevant arts that my novel process can equally well be employed to form other metallic parts or components.

It is well known that turbine engine blades may become damaged or distorted by foreign objects, load stresses, and high temperatures. Until a few years ago these blades were discarded because blade distortion reduces engine efficiency and/or causes erratic operation.

However, because of high blade replacement costs, methods for repairing blades are now being sought. For example, U.S. Pat. No. 3,574,924 issued Apr. 13, 1971, for Solid State Repair Method and Means describes a blade repair method using diffusion bonding in closed dies at relatively high temperatures over relatively long periods of time. This method, however, is not in use as it has not been approved or authorized by engine manufacturers.

Since the method disclosed in the foregoing patent was developed, I have repaired damaged blades by a procedure which includes cutting out distorted or damaged sections, replacing them with matching new sections, welding the new sections in place, and grinding or machining the blades to match the original contour. During this work I observed that many blades were only distorted, not missing metal; and it occurred to me that costly and time consuming cutting, welding, and grinding steps I had been employing to repair such blades could be eliminated. As a consequence of this observation, I invented a novel process that can be used either to restore a blade to its original shape or to change its shape to a new configuration.

That the latter goal can be realized is important because engine aerodynamics is a highly theoretical field; and much development in it is consequently done by cut-and-try techniques. That process of optimizing blade configuration is time consuming and costly because of the standard forging techniques that are employed to produce test blades. My process, on the other hand, provides a relatively low cost method for changing airfoil shapes so that engine designers can readily determine optimum blade configurations for such advanced engine operating goals as reduced engine noise, reduced specific fuel consumption, and increased engine thrust (reducing fuel consumption and lowering engine noise levels are currently receiving increased emphasis by engine manufacturers because of increasing fuel costs and more rigid noise pollution laws).

Briefly, my novel process for shaping turbine and compressor blades involves pressing the blades against a heated die face which either duplicates the original blade contour or provides a new desired shape. Cutting, welding, and grinding and the cost and time of accomplishing those steps are all consequently eliminated.

From the foregoing it will be apparent to the reader that one important, primary object of the present invention is the provision of novel, improved processes for restoring distorted turbine and compressor blades to their original contours.

Another primary and equally important object of my invention is to provide processes for reshaping turbine and compressor blades by changing the twists, contours, or tangential displacements thereof.

The principles of the present invention can also be employed to advantage to shape articles other than turbine and compressor blades to original or new contours.

Another important and primary object of my invention consequently resides in the provision of processes which are useful for such additional purposes.

Still other important, but more specific, objects of the present invention reside in the provision of processes in accord with the preceding objects:

which can be employed to shape high temperature metals and alloys;

which are relatively economical in that they eliminate the traditional sequence of cutting out and replacing sections, welding, and grinding to produce a change in the contour of an existent metal part.

Other important objects, features, and advantages of my invention will become apparent from the appended claims and as the ensuing detailed description and discussion proceeds in conjunction with the accompanying drawing, in which:

FIG. 1 is an end view of a retort for shaping metallic workpieces to original or new configurations in accord with the principles of the present invention;

FIG. 3 is a vertical section through the retort; and

As applied to the repair of turbine and compressor blades, a preliminary to the first step in my novel process is an examination to determine if reshaping is required and, if so, to what extent.

Blades that are twisted or have excessive bow or local deformations of not more than 15% can be reshaped by my process. Blades with local deformations over 15% can be brought within my process tolerance using hot platen dies. This is a well-known technique and is not part of my invention.

Blades that are to be reshaped or recontoured by the process disclosed herein are cleaned by standard methods; for example, by an alkali or acid dip and rinse. They are then coated with a protective coating. For titanium I use T-50, a commercial graphite—molydisulfide compound. This reduces oxidation when the recontouring is done in an air atmosphere. Other standard coatings are available for aluminum, superalloys, and other metallic materials.

Figure 2:
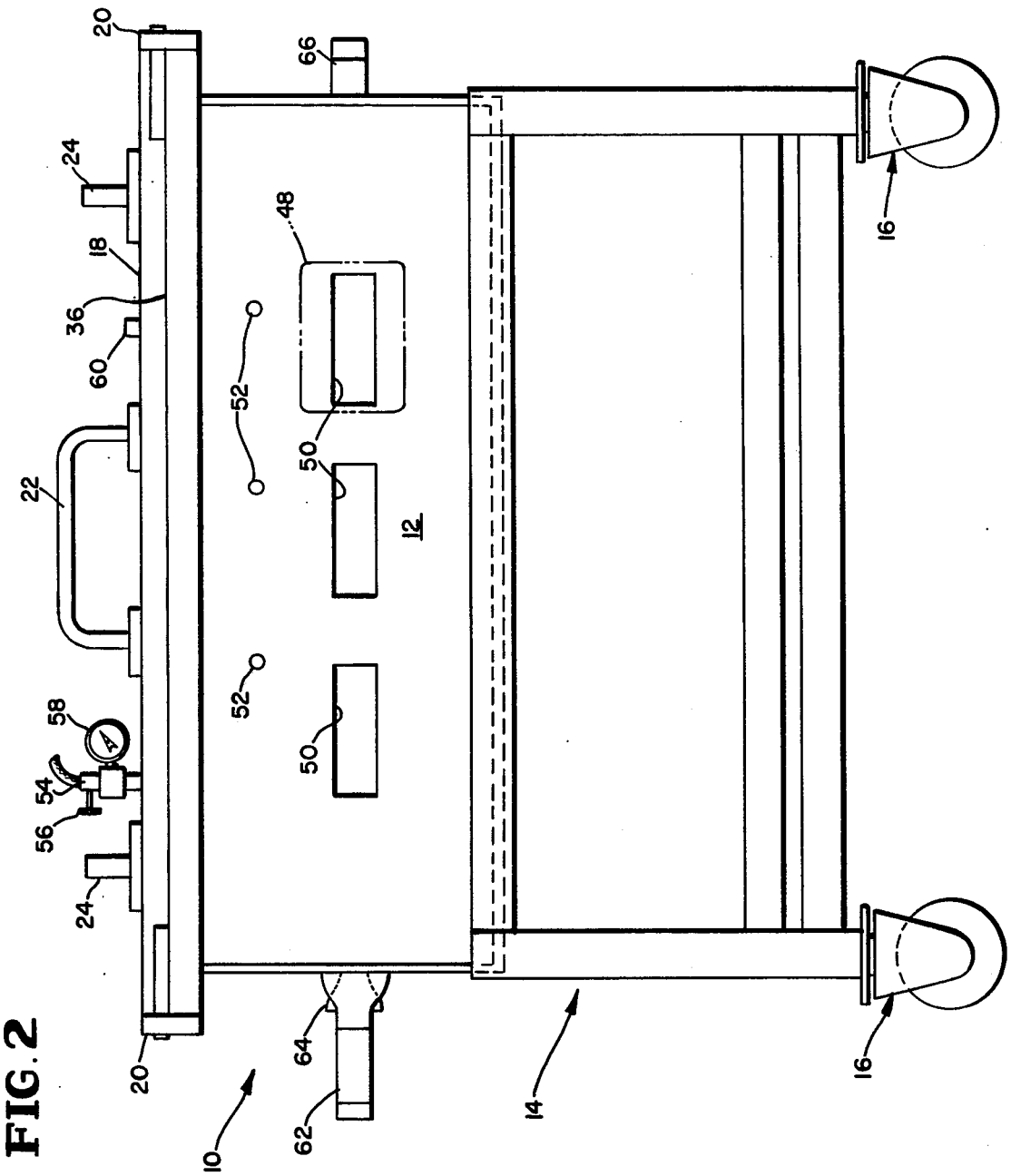
FIG. 2 is a front view of the retort.

The cleaned and coated blades are then positioned in a retort constructed in accord with the principles of the present invention such as the one illustrated in FIGS. 1-3 and identified by reference character 10.

Retort 10 has a housing or casing 12 and is supported on a stand 14 made mobile by casters 16.

A cover or lid 18 is pivotally fixed to housing 12 by hinges 20. Cover 18 can be opened and closed by a handle 22, manipulation of the cover being facilitated by counterweights 24.

Cover 18 can be locked in the illustrated, closed position by an eyebolt 26 and a nut 28 threaded on the bolt. The bolt is pivotally fixed to a casing-supported bracket 30 and extends upwardly through slots 32 and 34 in the casing and cover, respectively. The tightening of nut 28 clamps cover 18 against a rim 36 around the upper, open end of the casing.

Retort casing 12 is insulated as with the illustrated bricks 40. Housed in the casing is a single-faced die 42 having a die face 44 which is contoured to impart to the part being formed the configuration wanted in that part.

The die can be fabricated from either a metal or a ceramic. I prefer ceramics as expansion can be controlled, and suitable ceramics do not change shape on heating and have an extended life. One suitable ceramic is Thermasil 120, a commercial, castable, glass rock ceramic.

In the exemplary application of my invention referred to above—the reshaping or recontouring of turbine blades—the glass rock is cast to the desired blade contour with cutouts to accommodate the blade shrouds and root. Lateral holes are built in near the surface of the die face to accommodate heating elements (identified by reference character 46 in FIG. 3). The latter are used to elevate the temperature of the workpiece being shaped.

Turbine blades normally have both concave and convex sides. Therefore, for reshaping, one can use either a concave or convex faced die to impart the wanted contour to the blade.

I prefer a concave face as it facilitates holding the blade in the proper location. In addition, with a concave die face, the blade is positioned so that the forming pressure is normal or as near normal as possible to the concave side of the blade. This also helps to maintain the blade in the proper position by limiting its movement.

The part being formed is heated via conduction through the die by the electrical heating elements 46 referred to above (only one of which is shown). The heating elements, typically of the resistance type and fabricated of Nichrome, for example, are embedded in the die adjacent die face 44. Current is supplied to the heating elements via terminal blocks 48 aligned with cut-outs 50 in retort casing 12.

The temperature in the retort is monitored by thermocouples (not shown) having leads which extend to the exterior of the casing through apertures 52.

As will become apparent later, pressure can be applied to the workpiece being formed by applying fluid pressure to a flexible member and transmitting the resulting pressure to the workpiece via a body of a compliant, force transmitting material. The pressurizing fluid is supplied from a line 54 fitted with a valve 56, and the pressure is monitored by pressure gauge 58. The pressurizing fluid can be vented through line 60.

In many applications of my invention pressure can also (or instead) be applied to the article being formed by creating a vacuum in retort 10. The interior of the retort can be evacuated through a vacuum line 62 equipped with a safety plug 64. The degree of vacuum in the casing can be monitored by way of a vacuum gauge 66.

For reforming or shaping, a turbine or compressor blade (identified by reference character 68 in FIG. 3) is placed on the face 44 of die 42 with its edges matching positioning lines scribed on the surface. Metal shims (not shown) are then installed to support the lower edge of the root section, to prevent movement, and to support the shroud (or shrouds) of the blade in those die cavities provided to accommodate the latter.

It is important that those cutouts in the die face which accommodate the blade shrouds have sufficient clearance to allow the blade to move along its longitudinal axis during the forming cycle. It is also important the cutout for the blade root be so configured that the blade root can be held accurately.

After the blade has been installed and shimmed in place, it is covered with a sheet 70 of heat resistant or refractory material such as refrasil, asbestos, or the like. The cavity 72 in casing 12 above sheet 70 is then filled with a compliant, heat resistant, pressure transferring medium 74 such as pieces of refrasil or vermiculite (a heat expanded weathered mica). Strips of asbestos or heat resistant glass beads can also be employed.

The compliant material is kept out of contact with the part being formed by sheet 70 which is an important practical aspect of my invention. Specifically, as will become apparent hereinafter, the workpiece becomes plastic in the process of being formed by the novel techniques described herein. Consequently, particles of the compliant material (or any foreign material which comes into contact with the workpiece) can become embedded therein and/or emboss the workpiece. In both cases the defect is unacceptable because of the adverse conditions under which such components are required to operate at a high level of efficiency.

After cavity 72 is filled, a sheet 76 of a heat resistant rubber or silicone is placed over the top of the compliant material. Sheet 76 provides a vacuum or pressure tight seal when the lid of the retort is closed and clamped in place by tightening nut 28 and also serves as a pressure transmitting member in a manner described below.

After the retort is sealed, 2 or 3 pounds of air pressure is applied to the top of the rubber sheet seal 76; and heating elements 46 are energized to heat the workpiece. The temperature is measured and controlled by the above referred to thermocouples which are located alongside the blade when the latter is installed in retort 10.

Maximum air pressure is applied to the top of the rubber seal as the blade reaches the forming temperature. Up to 120 psig pressure has been used.

The heat and the pressure transmitted to the part being formed by the compliant material 74 cause the metal to flow plastically at a stress below its yield strength. Such plastic flow (or creep forming) permits each blade to match and retain the shape of die face 44.

Various combinations of vacuum and pressure with heat may be used in creep forming metal parts by my process. For example, with a hard vacuum (up to 30 inches of mercury) in blade member 72 and with the top of sealing sheet 76 open to standard air pressure, titanium blades can be creep formed to their original shape, or to a new shape, without applying any supplemental pressure.

Various heating schedules can also be employed.

For forming or contouring titanium blades, the blades are heated to between 1100 degrees F. (593 degrees C.) and 1300 degrees F. (705 degrees C.) at a pressure of between 15 and 50 psig. The heating time required is from 30 minutes to 4 hours. Also, in forming titanium, it may be advantageous to heat the part to 600 degrees F. (315 degrees C.) and soak it at that temperature for 30 minutes or so before raising the temperature to the 1100 degrees F. (593 degrees C.) forming level.

During heating I may also maintain an inert environment in the cavity 72 filled with compliant material 74. I have used vacuums of 25 to 30 inches of mercury and argon gas for this purpose. Both are quite effective in reducing alpha case or oxidation of titanium, for example.

After reshaping, the blades are cleaned and then inspected for tolerance using a guillotine gauge to check twist, contour, and tangential displacement.

The following examples illustrate the application of my invention to the forming of titanium jet engine blades.

EXAMPLE I

PRATT & WHITNEY JT-9 TURBINE BLADE

Place blade on die face, cover, and fill retort with vermiculite as described above. Cover with silicone seal, and close retort cover.

Raise temperature to 800 degrees F. (420 degrees C.).

Increase air pressure on top of seal to between 5 and 10 psig. Hold temperature and pressure for 15 minutes.

Raise temperature to 1175 degrees F. (630 degrees C.) and pressure to 35 psig. Hold for 1 hour.

Cool to 700 degrees F. (370 degrees C.), open retort, and remove blade.

Figure 4:
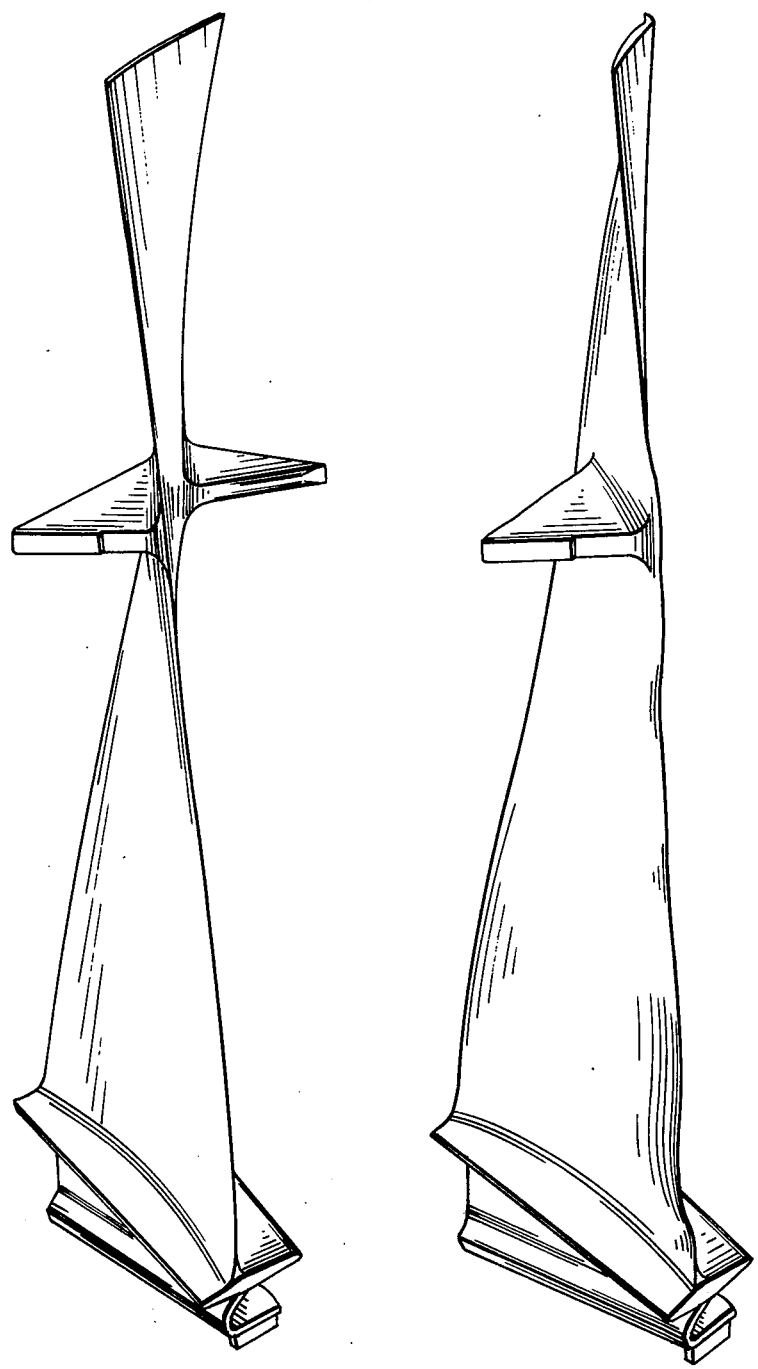
FIG. 4 is a "before-and-after" illustration which visibly demonstrates the capability the novel process disclosed herein has for altering the configuration of turbine blades; the original blade is shown on the left and the reshaped blade on the right.

The blade as originally contoured is shown at the left in FIG. 4. The blade, after reshaping, is shown on the right of that Figure. A comparison of the before and after illustrations makes evident the large changes in configuration that can be made in a single process cycle in hard to form metals by employing my novel forming process.

EXAMPLE II

GENERAL ELECTRIC CF-6 FAN BLADE

Place blade on die face, cover, and fill and seal retort as described above.

Raise temperature to 600 degrees F. (310 degrees C.) and pressure to between 5 and 10 psig. Hold for 15 minutes.

Raise temperature to between 900 degrees F. (480 degrees C.) and 1000 degrees F. (530 degrees C.), and hold for 15 minutes.

Pull vacuum in retort to between 25 and 30 inches of mercury.

Raise temperature to 1175 degrees F. (630 degrees C.) and pressure to 35 psig. Hold at temperature and pressure for two hours.

Cool to 700 degrees F. (370 degrees C.), remove vacuum, open retort, and remove blade.

The procedures described in the foregoing examples have proven effective and economically efficient for forming Ti6A14V blades. However, it is not critical that these particular regimens be slavishly followed; temperatures and pressures as well as heating times can be varied to accomplish the desired result as indicated above. In general, temperatures between 250 degrees F. (120 degrees C.) and 2000 degrees F. (1090 degrees C.) can be used depending upon factors such as the metal or alloy being shaped. Also, pressures from 15 psig to 120 psig and times at forming temperature of from 5 minutes to 6 hours can be used. It will be apparent to the reader that temperature, pressure, and time at temperature are related in my process. Each is selected according to good metallurgical practice to preclude material deterioration in the forming process.

My process is not size limited. For example, it may be used to shape blades ranging from 1" to over 40" long and from ½ to over 20" wide.

In the interest of conciseness and clarity I have described my novel process above primarily by reference to its application to the forming of titanium. It is by no means that limited, however. Other metallic materials that can advantageously be formed by the application of its principles include aluminum, iron, nickle, and cobalt and their alloys, superalloys, etc.

For the same reasons the foregoing discussion dealt, for the most part, with restoring parts to their original configurations. It can, however, also be used to alter the configuration of a part to a new shape as was pointed out above—for example, to change the twist, contour, or tangential displacement of a blade to a new design or form as was done in the case of the blade illustrated in FIG. 4. In addition, a blade can be reformed about its original centerline; or the centerline can be relocated with relation to the blade root, for instance.

The procedures are similar to those described above, but the single faced die is contoured to the new blade design. Fairly radical changes in shape may be made with a single die, and even more radical changes can be made by using convex and concave dies sequentially.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A process for altering the shape of a metallic workpiece which comprises the steps of: placing the workpiece on the face of a die which face has a configuration wanted in the workpiece and concurrently heating said workpiece and applying pressure thereto via a compliant body composed of discrete pieces of a heat resistant, pressure transmitting material and located on that side of the workpiece opposite the die, the temperature to which the workpiece is heated and the pressure applied thereto being so correlated as to cause the workpiece metal to flow plastically at a stress below its yield strength into contact with the face of said die to thereby impart the wanted configuration to the workpiece.

2. A process as defined in claim 1 which includes the step of disposing a flexible member in abutting relationship to the body of pressure transmitting material on the side thereof opposite the workpiece and in which the pressure is applied to the workpiece by applying a positive fluid pressure to said flexible member.

3. A process as defined in claim 1 in which the die, workpiece, and pressure transmitting material are isolated from the ambient surroundings, in which a flexible member is disposed in abutting relationship to the body of pressure transmitting material on the side thereof opposite the workpiece, and in which the pressure is applied to the workpiece by producing a negative pressure in the zone in which the pressure transmitting material is located.

4. A process as defined in claim 3 in which that side of the flexible member opposite the pressure transmitting material is exposed to atmospheric pressure and in which a vacuum of up to 30 inches of mercury is maintained in the zone in which said pressure transmitting material is located.

5. A process as defined in claim 1 in which the die, workpiece, and pressure transmitting material are isolated from the ambient surroundings; in which a flexible member is disposed in abutting relationship to the body of pressure transmitting material on the side thereof opposite the workpiece; and in which the pressure is applied to the workpiece by producing a negative pressure in the zone in which the pressure transmitting material is located and by applying a positive fluid pressure to that side of the flexible member opposite the pressure transmitting material.

6. A process as defined in claim 1 in which said workpiece is heated at a temperature in the range of 250 to 2000 degrees F. and under a pressure of 15 to 120 psig for a period of 5 minutes to 6 hours.

7. A process as defined in claim 1 in which the workpiece is fabricated of a titanium alloy and in which said workpiece is heated at a temperature in the range of 400 to 1450 degrees F. and the pressure applied to the workpiece is in the range of 15 to 50 psig.

8. A process as defined in claim 1 which includes the step of interposing a sheet of a flexible, heat resistant material between the workpiece and the body of compliant, pressure transmitting material to keep foreign material from contacting and damaging said workpiece while the latter is in a plastic or other softened condition.

9. A process as defined in claim 1 which includes the step of isolating the workpiece from the ambient surroundings and the step of creating an inert environment in the zone in which said workpiece is located by maintaining a vacuum in said zone.

10. A process as defined in claim 1 which includes the step of isolating the workpiece from the ambient surroundings and the step of creating an inert environment in the zone in which said workpiece is located by maintaining an inert gas atmosphere in said zone.

11. A process as defined in claim 1 in which the workpiece is heated by way of electrical resistance heating means disposed in said die adjacent the face thereof.

12. A process as defined in claim 1 in which the compliant, pressure transmitting material is asbestos, vermiculite, or a heat resistant glass.

13. A process as defined in claim 1 in which the die has a concave face portion facilitating the accurate positioning of the workpiece relative to the die.

14. A process for altering the shape of a metallic workpiece which includes the steps of:
providing a single die having a face with a contour that is wanted in said workpiece; housing said die in a retort means with the die face exposed; disposing the workpiece in said retort in an abutting relationship with said die face; covering said workpiece with a first sheet of a flexible, heat resistant material to thereby isolate said workpiece from contact by foreign material; disposing on the side of said sheet opposite said workpiece a compliant body composed of discrete pieces of a heat resistant, pressure transmitting material; isolating the interior of the retort from the ambient atmosphere by covering said body of pressure transmitting material with a second sheet of flexible material spanning said retort; applying pressure to said workpiece by creating a pressure differential across said second sheet of flexible material; and heating said workpiece at a selected forming temperature, the temperature at which the workpiece is heated and the pressure applied thereto being so correlated as to cause the workpiece metal to flow plastically at a stress below its yield strength into contact with the face of said die to thereby impart the wanted contour to the workpiece.

15. A process as defined in claim 14 in which said pressure differential is created by applying a positive fluid pressure to that side of the second sheet of flexible sheet material opposite the body of pressure transmitting material.

16. A process as defined in claim 14 in which said pressure differential is created by applying a positive fluid pressure to that side of the second sheet of flexible sheet material opposite the body of pressure transmitting material and concurrently maintaining a vacuum in that space between the first and second sheets of flexible material in which the pressure transmitting material is located.

17. A process as defined in claim 14 in which said pressure differential is created by communicating that side of the second sheet of flexible sheet material opposite the body of pressure transmitting material with the ambient environment and concurrently maintaining a vacuum in that space between the first and second sheets of flexible material in which the pressure transmitting material is located.

* * * * *